Sept. 8, 1970          H. L. SHATTO, JR          3,527,501

RESONANT VIBRATORY IMPULSE PLOW

Filed Jan. 4, 1968          4 Sheets-Sheet 1

INVENTOR:
H. L. SHATTO
BY: *Freling E Baker*
HIS ATTORNEY

VT FT/MIN.

INVENTOR:
H. L. SHATTO
BY: Freling E. Baker
HIS ATTORNEY

Sept. 8, 1970     H. L. SHATTO, JR     3,527,501
RESONANT VIBRATORY IMPULSE PLOW
Filed Jan. 4, 1968     4 Sheets-Sheet 3
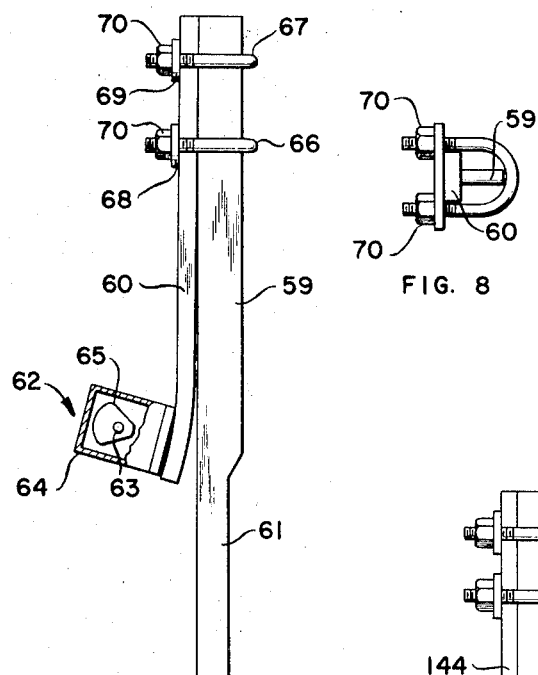
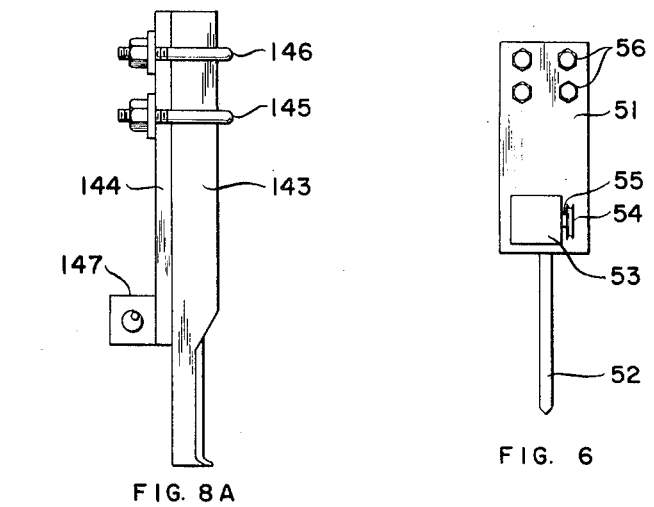
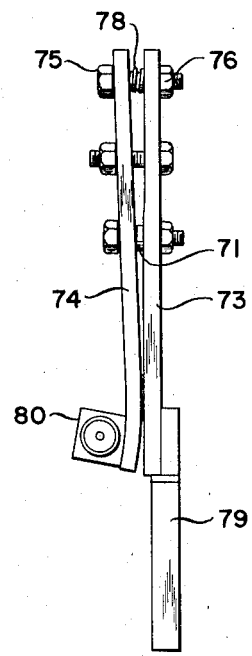
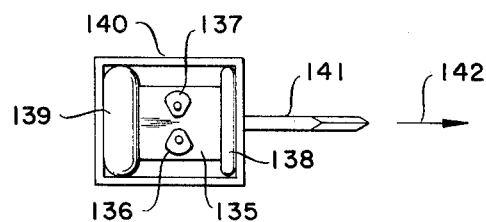
INVENTOR:
H. L. SHATTO
BY: *Freeling E Baker*
HIS ATTORNEY Sept. 8, 1970     H. L. SHATTO, JR     3,527,501

RESONANT VIBRATORY IMPULSE PLOW

Filed Jan. 4, 1968     4 Sheets-Sheet 4

INVENTOR:
H. L. SHATTO
BY: *Freling E Baker*
HIS ATTORNEY

United States Patent Office 3,527,501
Patented Sept. 8, 1970

3,527,501
RESONANT VIBRATORY IMPULSE PLOW
Howard L. Shatto, Jr., La Jolla, Calif., assignor to Shell Oil Company, New York, N.Y., a corporation of Delaware
Filed Jan. 4, 1968, Ser. No. 695,745
Int. Cl. A01b *35/00;* E21c *23/00*
U.S. Cl. 299—37                                  6 Claims

ABSTRACT OF THE DISCLOSURE

Non-linear elastic means is utilized to operatively connect an oscillator to a work member to provide a non-sinusoidal resonant vibratory system having a high velocity work stroke and a low velocity return stroke for greatly reducing draft or propulsive load on a work member.

BACKGROUND OF THE INVENTION

This invention relates to sonic tools and pertains more particularly to a non-linear spring, a sonic oscillator and a driven work member coupled to comprise a resonant vibratory system.

Sonic tools have recently achieved a wide range of industrial uses. These sonic tools typically employ an elastic resonant member coupled between an oscillator and a tool or work member such that when operated in its resonant mode the tool will be at a velocity antinode and undergoes a cyclic stroke movement against the work. Typical of such tools are sonic polishers, sonic scrapers, sonic cutters, sonic plows, etc. Typically, these tools go through a work stroke and a return stroke. The return stroke of such tools, in most cases is a waste of motion and in many cases results in a waste of energy. The waste of energy occurs particularly in situations where it is necessary to overcome friction on the return stroke. One example of such loss is on the return stroke in the cable plow or sonic trenching tool. In the use of a sonic trenching tool the trench is cut on the forward stroke of the cutting blade while on the return stroke the sides of the blade are in frictional engagement with the side walls of the trench. An analysis of the conditions and forces involved in sonic trench-forming indicates that the major forces are those resulting from coulumb friction which is independent of the velocity of the tool. There is very little, if any, viscous damping found under such conditions. This indicates that the damping force on the cutting blade is independent of the velocity of the blade. Further analysis reveals that it is desirable to make the cutting stroke as rapidly as possible and in addition, to limit the energy dissipated through friction on the back stroke. Prior known sonic cutting tools are not constructed to take advantage of the above knowledge, therefore unnecessarily waste considerable amounts of energy.

It is therefore a primary object of the present invention to overcome the aforementioned disadvantages of the prior art devices by providing apparatus having high velocity work stroke and low velocity longer duration return stroke.

It is a further object of the present invention to limit or minimize the energy dissipated by sonic tools on its non-work stroke by providing sonic tools with a low velocity return stroke.

A further object of the present invention is to provide means for reducing the draft or propulsive load on a sonic tool.

A still further object of the present invention is to provide cutting apparatus that takes advantage of side friction in a cut to provide a propulsive impulse to the apparatus.

The above and other objects of the present invention are obtained by providing a sonic resonant system with elastic resonant energy transmitting means having non-linear response characteristics which combine with non-linear or fraction load conditions to give a high acceleration, high velocity, short duration impulse on the forward or work stroke and a low acceleration, low velocity, long duration impulse on the return stroke.

BRIEF DESCRIPTION OF THE DRAWINGS

FIG. 5 is a side view of a cutting tool constructed in accordance with the principles of the present invention;

FIG. 6 is a rear view of the apparatus of FIG. 5;

FIG. 7 is a side view of a modified form of a resonator means of the present invention;

FIG. 8 is a top view of the apparatus of FIG. 7;

FIG. 8A is a side view of a slightly modified form of the apparatus of FIG. 7;

FIG. 9 is a side view of a modified form of a resonant means of a cutting apparatus constructed in accordance with the present invention;

FIG. 14 is a schematic illustration of a cutting apparatus constructed in accordance with the principles of the present invention;

DESCRIPTION OF THE PREFERRED EMBODIMENTS

Figure 1:
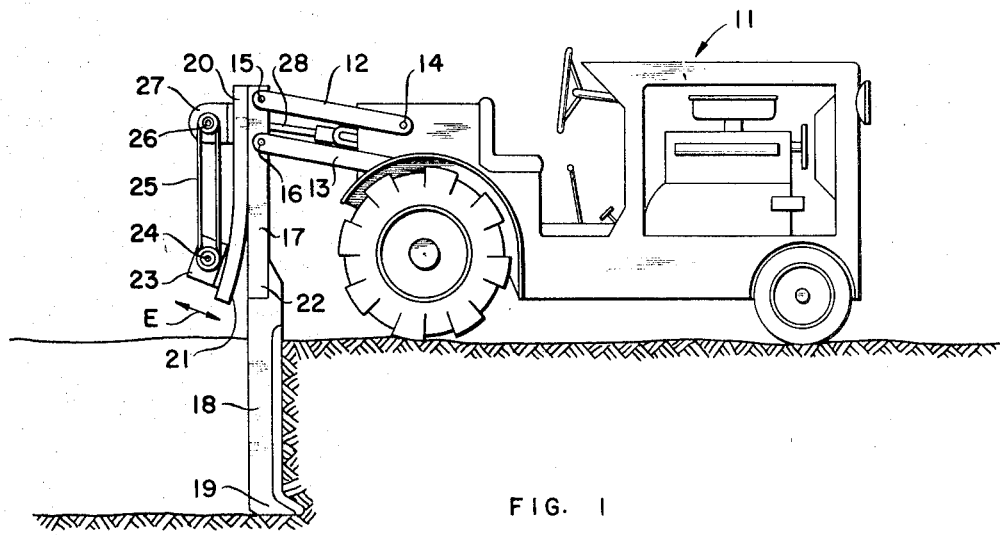
FIG. 1 is a side elevation of a sonic trench forming tool embodying the principles of the present invention.
Figure 2A:
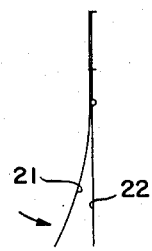
FIGS. 2a, 2b, 2c and 2d are schematic illustrations of the resonant means of the present invention in various stages of oscillatory movement.
Figure 2B:
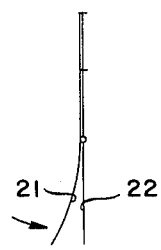
Figure 2C:
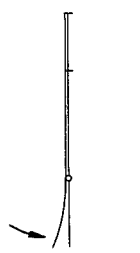
Figure 2D:

Referring now to the drawings there is illustrated a number of different tools incorporating the principles of the present invention. Illustrated in FIG. 1 is a sonic plow or trenching tool which typically includes a transport vehicle 11, illustrated in this example as being self-propelled for towing and transporting the sonic trenching apparatus. The trenching apparatus is suitably supported by means such as links 12 and 13 from the transport vehicle 11. The links 12 and 13 are preferably connected such as at 14 to power lift means (not shown) for raising and lowering the trenching apparatus. The links 12 and 13 are suitably connected such as by pivot pins 15 and 16 to elongated elastic member 17 to form support means therefor. A suitable cutting tool 18 having a point 19 is suitably connected to the free end of elastic member 17. A second elongated elastic member 20 is connected at its upper end to elastic member 17 and extends downward substantially parallel and along the back surface thereof. These elastic members 17 and 20 may be typically bars of a good grade of steel. A curved contacting surface 21 is formed on the elongated member 20 and is adapted to come into gradual contact with the rear surface 22 of elastic member 17. The curved surface can alternatively be placed on the driven member or both members can be curved to a lesser degree such that the total gives the desired curved gap. Also, the apparatus may be constructed so that there is no curved surface between them to obtain a different response. The funtion of these curved surfaces 21 and 22 will be more fully discussed below. A suitable oscillator or mechanical vibration generator 23 is coupled to the lower or free end of elastic member 21. The oscillator 23 may be of any suitable form and may generate forces in any manner such as by an eccentric mass mounted on a rotary shaft or an orbiting rotor confined in an internal raceway. Any suitable arrangement for driving the oscillator 23 may be provided such as a belt-pulley arrangement as illustrated wherein power is transmitted to pulley 24 by means of drive belt 25 and pulley 26 from gear box 27. The gear box 27 is driven in any suitable manner such as by power take-off shaft 28 from vehicle 11.

In describing the operation of the apparatus of FIG. 1, it is essential to remember that the elements 17, 18, 20 and 23 combine to form a resonant system having characteristic resonant responses. The elements 17 and 21 combine to form energy transmitting means between the oscillator and blade or work member and may be referred to as the resonator of the system. This resonator or spring is made non-linear, that is, with a high spring constant to accelerate the blade forward and a low spring constant to provide a low blade return force of long duration, to provide a good propelling impulse. The resonance of this system, of course, will change as the load on blade 18 changes. Operation of the oscillator or vibration generator 23, preferably within the resonant frequency range of the system, imposes alternately directed forces on elastic member 20, moving the lower end of this member 20 back and forth as shown by double-headed arrow E, FIG. 1. This back and forth movement of elastic member 20 alternately moves this member progressively into and out of engagement along face 21 with surface 22 on elastic member 17 as illustrated in FIGS. 2a through 2d. As it can be seen elastic member 20 and driven member 17 resonantly oscillate about a nodal point near their upper end and when undamped cyclicly impact or bounce against each other in much the same manner as a tuning fork whose sides or tines are close enough to bounce as they come together. If driven member 17 is damped with a friction load, then an elastic member 20 has progressively entered engagement elastic with member 17 as shown in FIGS. 2a through 2d energy is transferred from member 20 to member 17. The majority of this energy is transferred in the form of a high energy impulse and gives members 17 and 18 a kick or impulse forward or away from elastic member 20. Driven member 17 accelerates rapidly to the right away from the elastic member 20 under the impact or influences of each of these impulses from resonant member 20. After each work stroke to the right of elastic member 17 it is urged by the low force of the low spring rate to return to the left into position for another impact from elastic member 20. However, if the low force tending to bring members 17 and 20 back together is chosen to be just under the force exerted on cutting blade 18 by side friction on the walls of the trench, the cutting blade 18 will remain substantially in its position and member 20 will have farther to move forward, and while doing so the gentle spring force is trying to pull the blade to the rear but instead provides a long low impulse tending to propel the remainder of the plow system and structure forward. It is the net summation of the retarding and propelling impulses that a tractor sees as draft or draw-bar pull.

Figure 3:
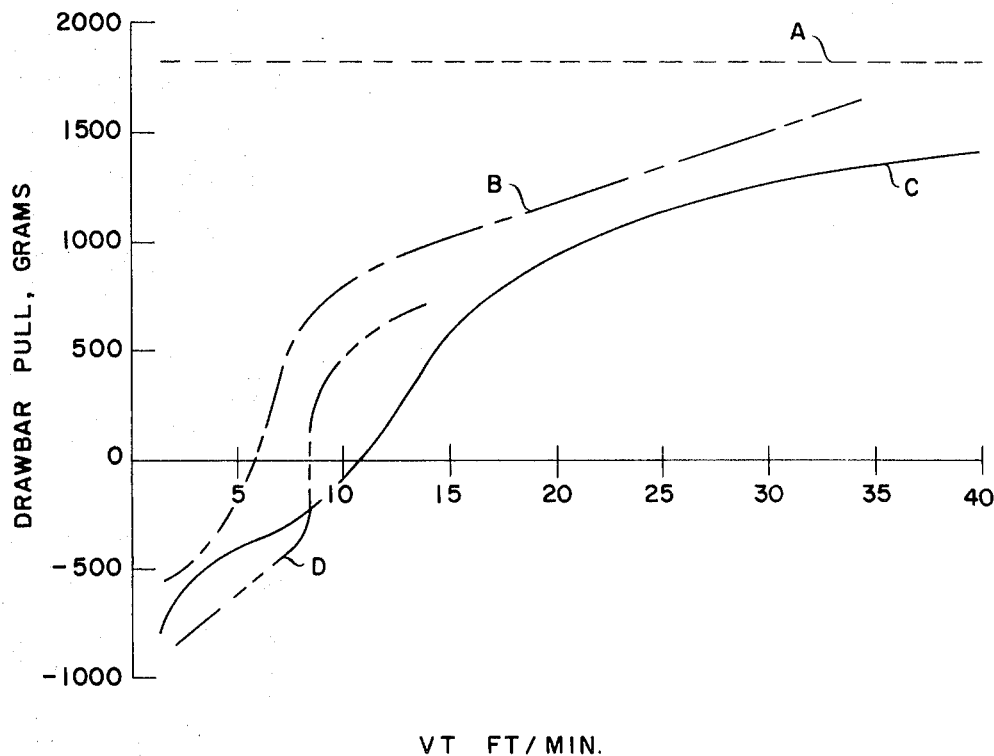
FIG. 3 is a plot of draw-bar pull versus forward velocity of a vehicle towing a trenching tool constructed in accordance with principles of the present invention.

The above-described operating characteristics of the FIG. 1 embodiment of the present invention produce some dramatic results that are illustrated in FIG. 3. The plot in FIG. 3 also illustrates the results of changing the parameters of the components that go to make up this system. In the graph of FIG. 3 is plotted the velocity of the towing vehicle versus draw-bar pull for a scale test model constructed in accordance with the principles of the present invention. Line A on this chart indicates the draw-bar pull of the model without vibration of the blade. This is also called the dead blade pull. Plots B, C and D illustrate the results respectively of changing the relative stiffness of the elastic member as illustrated in FIGS. 5 to 8 and the change in contact or engagement between the two elastic members as illustrated in FIG. 9. Curve B represents FIG. 7, curve C represents FIG. 8A, and curve D represents FIG. 9. It is to be noted that these plots all extend through the zero draw-bar pull point to the negative side at low forward velocities. These plots show that quite a substantial forward speed is maintained with these plows without any draw-bar pull at all, that is when completely disconnected from any towing vehicle. Moreover they can even push against any retarding force to the extent of one third or so of the value of dead blade pull before being forced to a complete stall of forward speed. Looking at line C, for example, at draw-bar pull of zero, the forward velocity is about 11 feet per minute. Furthermore, if it is required to push forward against a retarding draw-bar force of approximately 400 grams on the scale model, it is still able to propel itself forward at a velocity of about five feet per minute.

Figure 4:
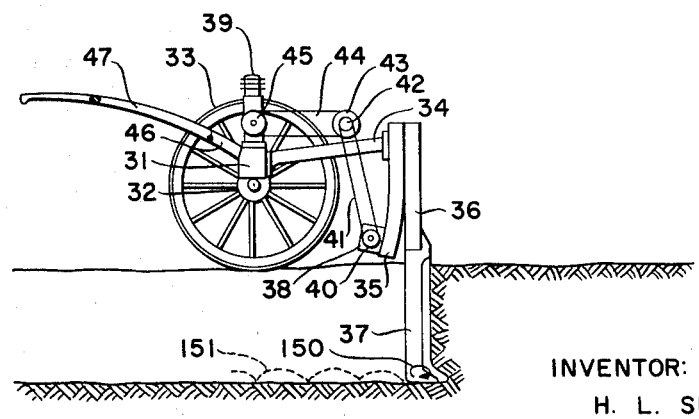
FIG. 4 is a side elevation with portions cut away of a second embodiment of a trenching tool constructed in accordance with the principles of the present invention.

Illustrated in FIG. 4 is a soil-cutting or cultivating apparatus incorporating the above principles for taking advantage of the forward impulse on the vehicle by the back reaction of the blade as it attempts to move backward in the trench or furrow. This apparatus comprises the main body member 31 which is attached to and supported by an axle 32 on which is rotatably supported a pair of wheels such as 33. Elongated support means 34 is attached to the forward end of body member 31 and extends forward thereof and supports, at its outer end, non-linear resonator means which comprises elongated elastic member 35 and elongated elastic member 36. A cutting blade or other earth-working implement 37 is attached to the lower end of elastic member 36. Operatively connected to lower or free end of elongated elastic member 35 is a sonic vibration generator or oscillator 38. The vibration generator or oscillator 38 is driven in a suitable manner such as by prime mover means 39. A suitable belt and pulley arrangement comprising a pulley 40 operatively coupled to the drive shaft of oscillator 38 is driven by means of a flexible belt 41 which extends over pulley 42 which is driven by a pulley 43 and flexible belt 44 from pulley 45 on prime mover means 39. A pair of handles 46 and 47 for guiding and manipulating the apparatus and supporting control mechanisms, such as a throttle control for prime mover means 39, are attached to the main body member 31 and extend backward therefrom. The apparatus of FIG. 4 is operated in substantially the same manner as described in regard to the apparatus of FIG. 1. However, the FIG. 4 apparatus relies solely on the back reaction of the blade 37 against the sidewalls of the trench in the formation for propelling the vehicle forward. This reaction is generally due to frictional engagement between the cutting blade and the sidewalls of the trench. However, a back reaction may be obtained by the engagement of the lower end of the cutting tool with the bottom of the trench. This is the result of using a single rotor oscillator which imparts radially directed forces to the rapper or driving bar 35 which forces are transmitted to the lower end of the cutting blade causing it to move in an elliptical path illustrated by path 150 in FIG. 4. The motion of this portion with respect to the bottom of the trench is illustrated by dashed line 151.

Illustrated in FIGS. 5 through 8 are examples of how the parameters of the components of the apparatus may be modified to achieve the desired results. With these modifications of the apparatus, results similar to that illustrated by lines B, C, and D in FIG. 3 are achieved. As illustrated in FIG. 5, elongated elastic members 50 and 51 are operatively connected together such as by means of a set of bolts 56. A suitable tool such as earthworking implement 52 is attached to the lower end of elastic member 50. A suitable sonic oscillator or vibration generator 53 is operatively connected to the lower end of the elastic member 51. A suitable pulley 54 is mounted on shaft 55 to which a prime mover (not shown) may be suitably coupled by means of a belt (not shown).

FIGS. 7 and 8 illustrate a modification in which the forward or driven elastic member 59 is considerably stiffer in the plane of the lateral mode of vibration than that of the elastic member 60 and therefore capable of working best in areas with high side friction. A suitable cutting or work tool 61 is carried on the lower or free end of elastic member 59. A suitable vibration generator or oscillator 62 is coupled to the lower end of elastic member 60. The vibration generator 62 is illustrated as the rotating eccentric weight type having a rotatable shaft 63 rotatably journaled in a housing 64 and an eccentric mass 65 fixed to shaft 63. Other vibration generators such as the orbiting rotor type shown in U.S. Pat. 2,960,314, issued to A. G. Bodine, are suitable for use with the present invention. Elastic members 59 and 60 may be coupled together in any suitable manner such as by a pair of U bolts 66 and 67 extending around elastic members 59 and 60 and a pair of bars 68 and 69 held in place and pulled against elastic member 60 by means of a plurality of nuts 69. This modification of the present invention gives a response indicated by line C on FIG. 3.

FIG. 8A illustrates a modification of the present apparatus in which the contact surface between the two bars 143 and 144 is straight. The two bars 143 and 144 are positioned flat against one another and attached together such as by means of clamps 145 and 146. A suitable oscillator 147 is coupled to the lower end of bar 144.

A further modification of the apparatus of the present invention may be as illustrated in FIG. 9. In this modification a pair of elastic members 73 and 74 are attached together at their upper ends such as by means of plurality of bolts 75 and nuts 76 and held apart by means of spacers 71 and 78. The spacing between the two members 73 and 74 may be adjusted such as by the inclusion of a plurality of spacers at either 71 or 78. The members 73 and 74 are spaced generally a suitable distance apart such that member 74 periodically impacts against the member 73 during operation of the apparatus. Suitable work tool means 79 is operatively attached to the lower or free end of elastic member 73. A suitable vibration generator or oscillator 80 is operatively attached to the lower or free end of elastic member 74. This modification of the apparatus gives a response such as that illustrated by line D in FIG. 3. The flat rapper bar shown in FIG. 8A gives a sharper impact and therefore capability to move against higher forward cutting forces but it returns less energy to the rapper bar each cycle and therefore runs at a lower Q and therefore lower resonant response.

Figure 10:
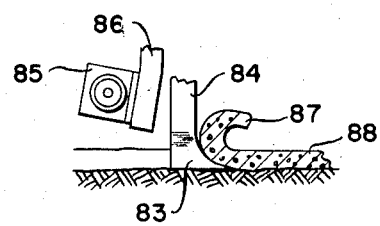
FIG. 10 is a side view of a portion of an apparatus for cutting plastic materials embodying the principles of the present invention.

Illustrated in FIG. 10 is a portion of an apparatus incorporating the present invention for cutting grooves in material such as asphalt pavement. In this embodiment a cutting blade 83 is illustrated, attached to or formed on the elastic member 84. A sonic oscillator 85 is illustrated as being attached to the lower end of a second elastic member 86 and adapted to sonically drive elastic member 84 as in previous embodiments. The apparatus is illustrated as cutting and peeling back a strip 87 on a layer 88 of asphalt.

Figure 11:
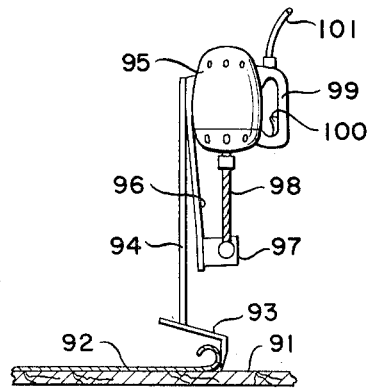
FIG. 11 is a side view of an apparatus for scraping incorporating the principles of the present invention.

The principles of the present invention are also useful when embodied in other apparatuses such as hand tools for example. Illustrated in FIG. 11 is an apparatus embodying the principles of the present invention for scraping and chipping paints, scales, and other such materials from surfaces. As illustrated in FIG. 11, a structure 91 is coated with a material 92 which is being removed or scraped away by means of a tool 93 which is driven by an apparatus incorporating a non-sinusoidal resonator embodying the principles of the present invention. As shown, an elongated elastic member 94 is attached in any suitable manner to a housing of portable prime mover means 85. A second elongated elastic member 96 also connected in a suitable manner to the housing of prime mover means 95 extends down along adjacent elastic member 94 and is slightly spaced therefrom. A vibration generator or oscillator 97 is coupled to the lower or outer end of elastic member 96 and is driven such as by flexible drive shaft 98 by prime mover means 95. The prime mover means 95 is illustrated as a small portable electric motor having a suitable handle 99 for grasping and manipulating the tool. A finger actuated switch 100 for completing a circuit from a source of electrical power via cord 101 for activating the motor 95 is incorporated in the handle 99.

Figure 12:
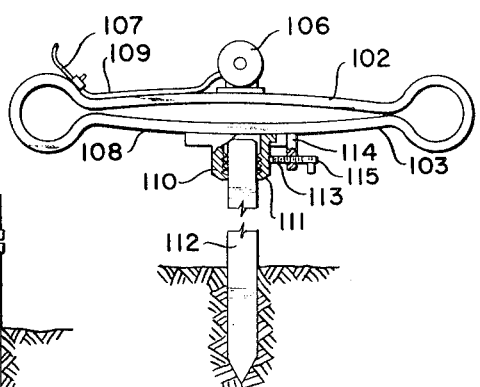
FIG. 12 is a side view of an apparatus for stake driving embodying the principles of the present invention.

The apparatus of FIG. 12 illustrates the embodiment of the present invention in an apparatus suitable for driving stakes and similar members. As illustrated in FIG. 12, a pair of elongated elastic members 102 and 103 having slight curvatures to form a space therebetween are attached together at their outer ends in any suitable manner to form resonator means. A pair of handles 104 and 105 are attached to the outer ends of the resonator means. The vibration generator 106 is coupled in a suitable manner to the center of elastic member 101. The vibration generator 106 may be of any suitable type such as the air or gas operated type such as illustrated in U.S. Pat. No. 3,295,837, issued Jan. 3, 1967, to Mr. A. G. Bodine. A conduit 107 from a source of pressurized air or gas leads to control or throttle means 108 incorporated in handle 105 and then to conduit 109 to fluid motor oscillator 106. The control means 108 controls the supply of fluid to the oscillator 106 and hence the speed also of the oscillator. A suitable clamp means having a fixed jaw 110 and movable jaw 111 is attached to the lower elastic member 103 for gripping and holding stakes, posts, and other similar objects. The movable jaw 111 is moved into an engagement with a driven member 112 by means of a screw 113 which threadably engages a portion 114 of the clamp body member and is rotated by suitable handle 115.

Figure 13:
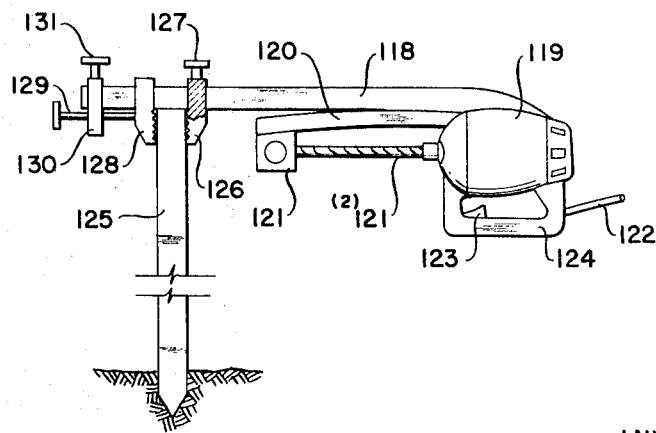
FIG. 13 is a side view of an apparatus for stake pulling embodying the principles of the present invention.

Illustrated in FIG. 13 is an apparatus for the pulling or driving of stakes or posts and other similar objects. This apparatus comprises an elongated elastic bar 118 connected to the housing of a prime mover means 119 and extending outward therefrom. A second elastic member 120 extends outward from the housing of prime mover means 119 along and adjacent elastic member 118 and curves slightly outward therefrom. A suitable vibration generator or oscillator 121 is suitably coupled to the outer or free end of resonant member 120 and is driven in a suitable manner from prime mover means 119 by means of a flexible drive shaft 121. A conductor cable 122 supplies current to prime mover means 119. A suitable finger-actuated control means 123 in handle 124 manipulates a switch not shown to control the supply of electrical current to prime mover means 119. On the outer end of elastic member 118 is attached suitable clamping means for clamping to or gripping a post or stake member 125 for removing it from a formation. A suitable clamping means includes a slidable jaw means 126 which may be fixed in position on bar 118 by means of a set screw 127. A second jaw 128 is moved into and out of engagement with the stake member 125 by means of a screw 129 which threadably engages body 130 which is clamped into position on member 118 by means of set screw 131. The above-described clamp apparatus may be removed from elastic bar 118, rotated 180° with respect thereto, and re-mounted thereon so that the apparatus may then be used for driving stakes and posts.

While the present invention has been illustrated and described in connection with a number of specific illustrated embodiments, it is to be understood that the present invention has wide utility in connection with a number of other tools and apparatuses without departing from the scope thereof. Furthermore, a number of different machanisms and arrangements of parts may be utilized to obtain the desired forward impulse. For example, illustrated in FIG. 14 is an arrangement utilizing air springs to form a non-sinusoidal resonator for obtaining the results in accordance with the principles of the present invention. As shown in FIG. 14, a vibration generator or oscillator 135, comprising a pair of counter-rotating masses 136 and 137, is operatively coupled by means of a thin or small volume air spring 138 and a large volume air spring 139 to frame or support means 140 to which is operatively connected a work member 141. The smaller or thinner air spring 138 provides a harder cushion between the oscillator 135 and the frame 140 than the large air spring 139. This results in a higher spring rate for high acceleration quick force application to the blade 141 in the direction of movement thereof (arrow 142) and a lower spring rate for lower acceleration force with longer duration in the opposite direction.

Figure 16:
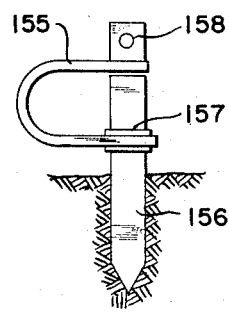
FIG. 16 is a side view of a further modification of apparatus for driving stakes.
Figure 15:
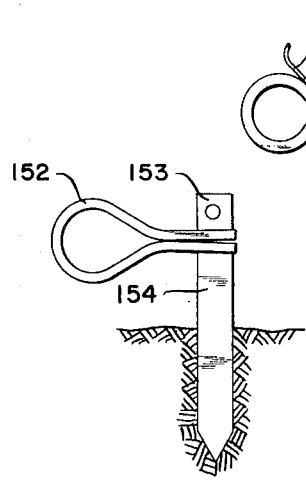
FIG. 15 is a side view of a modified form of apparatus for driving stakes.

FIGS. 15 and 16 illustrate other possible configurations for a suitable non-linear spring or resonator arrangement for sonic apparatus. In FIG. 15 the spring or resonant member 152 is constructed of one piece and curved around so that the portions near the two ends extend along adjacent one another for a short distance. These two portions are spaced for slight clearance and for progressive contact on impact to give less sharp impact but a greater resonant response. An oscillator 153 is coupled to one end of this member and the other end is used to drive the work member or may be suitable for driving a stake 154.

In FIG. 16 is illustrated a substantially U-shaped spring or resonant member 155. One leg of the resonator member 155 is adapted to hold a work member or object to be driven such as a stake 156 by means of a clamp 157. The other leg is adapted to be coupled to an oscillator 158 and to impact against the upper end of the stake 156.

Figure 17:
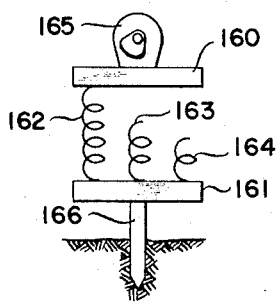
FIG. 17 is a schematic illustration of a further modification of apparatus for carrying out the present invention.

Another arrangement of apparatus for giving a non-linear resonant response to sonically driven apparatus in accordance with the principles of the present invention is illustrated in FIG. 17. This apparatus comprises a pair of masses 160 and 161 which are coupled together by means of a spring 162. Other springs 163 and 164 of different lengths are interposed between these masses 160 and 161. An oscillator 165 is coupled to one of the masses 160 and the other mass 161 is coupled to or serves as the work member for driving a stake 166. As the members 160 and 161 move toward springs 163 and 164 are progressively engaged and the spring or coupling therebetween becomes stiffer and as these members move apart the coupling becomes more elastic.

Other modifications and arrangements of parts will be obvious to those skilled in the art without departing from the scope of the present invention as defined by the appended claims.

I claim as my invention:

1. A non-linear resonant vibrationary work system, said system comprising:
   an oscillator;
   an elongated work member, said work member being supported for a work stroke in a direction transverse to the longitudinal axis thereof; and
   elastic energy transmission means operatively connecting said oscillator to said work member and operative to apply oscillatory forces from said oscillator to said work member both along the direction of said work stroke and in the opposite direction, said forces being a short duration high force along said work stroke and a long duration low force thereto in an opposite direction; and
   said work member being responsive to frictional engagement with a work media to provide back reaction to restrain backward movement of said system during application of said long duration low force.

2. The system of claim 1 wherein:
   said resonant transmission means comprises an elongated elastic member fixedly supported at one end extending along and adjacent to said work member; and, the other end of said member supporting said oscillator and being adapted to move toward and away from said work member under the action of said oscillator.

3. The system of claim 1 wherein said resonant transmission means comprises an elongated elastic member positioned in a manner such that a portion near one end thereof extends along and closely adjacent a portion of said work member near the work engaging end thereof.

4. The system of claim 3 wherein said oscillator is coupled to said energy transmission means near one end thereof and said work member is connected to said transmission means near the other end thereof.

5. A vibratory work performing system, said system comprising:
   an oscillator;
   an elongated earth cutting work member, said work member including an earth engaging portion and being supported for work stroke transverse to the longitudinal axis thereof;
   said earth engaging portion including friction means to engage the side walls of said slot to restrain backward travel of said tool in said slot; and
   non-linear elastic means operatively connecting said oscillator to said work member to form a resonant vibratory system responsive to accelerate the entire earth cutting portion of said work member rapidly along said work stroke and applying a force to said work member slowly in an opposite direction.

6. The system of claim 5 wherein said elastic transmission means comprises an elongated elastic member connected at one end to said work member and extending substantially parallel thereto; and, said elastic member supporting said oscillator for oscillatory movement substantially in the plane of said work stroke.

References Cited

UNITED STATES PATENTS

| 246,352 | 8/1881 | Tracy | 173—100 X |
| 3,008,528 | 11/1961 | Berthet et al. | 173—49 |
| 3,151,191 | 10/1964 | Herrmann | 173—49 X |
| 3,215,209 | 11/1965 | Desvaux et al. | 173—49 |
| 3,367,716 | 2/1968 | Bodine | 299—14 |
| 3,437,381 | 4/1969 | Bodine | 299—14 X |

FOREIGN PATENTS 483,893  4/1938  Great Britain.

ERNEST R. PURSER, Primary Examiner

U.S. Cl. X.R.

172—40; 173—49